United States Patent
Park

(10) Patent No.: US 9,678,307 B2
(45) Date of Patent: Jun. 13, 2017

(54) LENS MODULE

(71) Applicant: SAMSUNG ELECTRO-MECHANICS CO., LTD., Suwon-Si (KR)

(72) Inventor: Il Yong Park, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/635,082

(22) Filed: Mar. 2, 2015

(65) Prior Publication Data

US 2016/0085052 A1   Mar. 24, 2016

(30) Foreign Application Priority Data

Sep. 22, 2014   (KR) .................. 10-2014-0126161

(51) Int. Cl.
   *G02B 15/14*   (2006.01)
   *G02B 13/00*   (2006.01)
   *G02B 9/62*    (2006.01)

(52) U.S. Cl.
   CPC ........... *G02B 13/0045* (2013.01); *G02B 9/62* (2013.01)

(58) Field of Classification Search
   CPC ........ G02B 15/177; G02B 7/10; G02B 13/02; G02B 13/04; G02B 13/24; G02B 9/64; G02B 13/00; G02B 21/02
   USPC ....... 359/682, 695, 745, 749, 752, 754, 755, 359/756, 757, 750, 751, 657, 658
   See application file for complete search history.

(56) References Cited

U.S. PATENT DOCUMENTS

| | | | |
|---|---|---|---|
| 8,432,619 B2 * | 4/2013 | Huang | G02B 13/0045 359/713 |
| 2012/0243108 A1 | 9/2012 | Tsai et al. | |
| 2013/0215301 A1 | 8/2013 | Huang | |
| 2014/0049843 A1 * | 2/2014 | Kubota | G02B 9/62 359/757 |
| 2014/0118817 A1 * | 5/2014 | Jung | G02B 13/0045 359/355 |
| 2014/0153117 A1 * | 6/2014 | Hagiwara | G02B 13/0045 359/757 |
| 2014/0320981 A1 | 10/2014 | Hsieh et al. | |
| 2015/0168677 A1 | 6/2015 | Lee et al. | |

FOREIGN PATENT DOCUMENTS

| | | |
|---|---|---|
| KR | 10-2010-0040357 A | 4/2010 |
| KR | 10-2015-0070858 A | 6/2015 |
| TW | 201333518 A1 | 8/2013 |

OTHER PUBLICATIONS

Korean Office Action issued on Mar. 23, 2016 in counterpart Korean Patent Application No. 10-2014-0126161 (8 pages, with English translation).

* cited by examiner

*Primary Examiner* — Stephone B Allen
*Assistant Examiner* — Rahman Abdur
(74) *Attorney, Agent, or Firm* — NSIP Law

(57) ABSTRACT

There is provided a lens module including: a first lens having positive refractive power; a second lens having negative refractive power; a third lens having positive refractive power; a fourth lens having negative refractive power and having a convex image-side surface; a fifth lens having negative refractive power; and a sixth lens having negative refractive power and having one or more inflection point on an image-side surface thereof.

28 Claims, 24 Drawing Sheets

| SURFACE NO. | RADIUS OF CURVATURE | THICKNESS/ DISTANCE | REFRACTIVE INDEX | ABBE NUMBER | REMARK |
|---|---|---|---|---|---|
| Object | Infinity | Infinity | | | |
| 1 | Infinity | 0.030 | | | |
| 2 | 1.34 | 0.638 | 1.546 | 56.1 | FIRST LENS |
| 3 | 6.67 | 0.100 | | | |
| 4 | 5.78 | 0.250 | 1.645 | 23.3 | SECOND LENS |
| 5 | 2.20 | 0.000 | | | |
| 6 | Infinity | 0.273 | | | STOP |
| 7 | 17.01 | 0.280 | 1.546 | 56.1 | THIRD LENS |
| 8 | -8.47 | 0.308 | | | |
| 9 | -2.58 | 0.422 | 1.645 | 23.3 | FOURTH LENS |
| 10 | -3.75 | 0.154 | | | |
| 11 | 82.14 | 0.395 | 1.645 | 23.3 | FIFTH LENS |
| 12 | 79.09 | 0.100 | | | |
| 13 | 1.39 | 0.490 | 1.536 | 55.7 | SIXTH LENS |
| 14 | 1.13 | 0.300 | | | |
| 15 | Infinity | 0.210 | 1.518 | 64.2 | FILTER |
| 16 | Infinity | 0.649 | | | |
| Image | Infinity | 0.000 | | | IMAGING SURFACE |
| Image | Infinity | 0.000 | | | |

FIG. 3

| FIRST EXEMPLARY EMBODIMENT | 2 | 3 | 4 | 5 | 7 | 8 | 9 | 10 | 11 | 12 | 13 | 14 |
|---|---|---|---|---|---|---|---|---|---|---|---|---|
| RADIUS OF CURVATURE | 1.337 | 6.670 | 5.779 | 2.203 | 17.010 | -8.475 | -2.581 | -3.746 | 82.142 | 79.093 | 1.388 | 1.129 |
| CONIC CONSTANT (K) | -0.032 | -9.426 | -17.761 | 5.253 | -1.000 | 8.350 | 3.087 | -17.984 | 0.000 | -18.765 | -4.123 | -0.905 |
| 4-TH ORDER COEFFICIENT (A) | 0.006 | -0.096 | -0.204 | -0.187 | -0.147 | -0.141 | -0.156 | -0.239 | 0.153 | 0.091 | -0.347 | -0.459 |
| 6-TH ORDER COEFFICIENT (B) | 0.003 | 0.175 | 0.394 | 0.278 | -0.022 | 0.077 | 0.475 | 0.471 | -0.232 | -0.110 | 0.161 | 0.301 |
| 8-TH ORDER COEFFICIENT (C) | 0.018 | -0.141 | -0.323 | -0.183 | -0.073 | -0.400 | -1.162 | -0.891 | 0.108 | 0.033 | -0.037 | -0.170 |
| 10-TH ORDER COEFFICIENT (D) | -0.021 | 0.058 | 0.071 | -0.242 | 0.141 | 0.698 | 1.748 | 1.050 | -0.023 | -0.002 | 0.005 | 0.069 |
| 12-TH ORDER COEFFICIENT (E) | 0.017 | -0.013 | 0.070 | 0.693 | -0.073 | -0.405 | -1.247 | -0.646 | 0.002 | -0.001 | 0.000 | -0.018 |
| 14-TH ORDER COEFFICIENT (F) | 0.000 | 0.001 | -0.048 | -0.784 | 0.016 | 0.052 | 0.366 | 0.196 | 0.000 | 0.000 | 0.000 | 0.003 |
| 16-TH ORDER COEFFICIENT (G) | 0.000 | 0.000 | 0.009 | 0.323 | -0.001 | 0.000 | -0.030 | -0.023 | 0.000 | 0.000 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 4

| SURFACE NO. | RADIUS OF CURVATURE | THICKNESS/ DISTANCE | REFRACTIVE INDEX | ABBE NUMBER | REMARK |
|---|---|---|---|---|---|
| Object | Infinity | Infinity | | | |
| 1 | Infinity | 0.030 | | | |
| 2 | 1.36 | 0.653 | 1.546 | 56.1 | FIRST LENS |
| 3 | 7.28 | 0.100 | | | |
| 4 | 6.01 | 0.250 | 1.645 | 23.3 | SECOND LENS |
| 5 | 2.27 | 0.000 | | | |
| 6 | Infinity | 0.281 | | | STOP |
| 7 | 16.60 | 0.305 | 1.546 | 56.1 | THIRD LENS |
| 8 | −11.47 | 0.302 | | | |
| 9 | −2.68 | 0.419 | 1.645 | 23.3 | FOURTH LENS |
| 10 | −3.29 | 0.135 | | | |
| 11 | −25.09 | 0.387 | 1.645 | 23.3 | FIFTH LENS |
| 12 | 40.33 | 0.100 | | | |
| 13 | 1.34 | 0.505 | 1.536 | 55.7 | SIXTH LENS |
| 14 | 1.15 | 0.300 | | | |
| 15 | Infinity | 0.210 | 1.518 | 64.2 | FILTER |
| 16 | Infinity | 0.652 | | | |
| Image | Infinity | 0.000 | | | IMAGING SURFACE |

FIG. 7

| SECOND EXEMPLARY EMBODIMENT | 2 | 3 | 4 | 5 | 7 | 8 | 9 | 10 | 11 | 12 | 13 | 14 |
|---|---|---|---|---|---|---|---|---|---|---|---|---|
| RADIUS OF CURVATURE | 1.356 | 7.279 | 6.006 | 2.268 | 16.596 | -11.471 | -2.676 | -3.286 | -25.089 | 40.327 | 1.337 | 1.151 |
| CONIC CONSTANT (K) | -0.042 | -9.482 | -18.159 | 5.406 | -1.000 | 8.350 | 3.727 | -15.683 | 86.623 | -18.765 | -4.882 | -0.899 |
| 4-TH ORDER COEFFICIENT (A) | 0.006 | -0.090 | -0.192 | -0.174 | -0.136 | -0.142 | -0.187 | -0.271 | 0.177 | 0.081 | -0.311 | -0.439 |
| 6-TH ORDER COEFFICIENT (B) | 0.005 | 0.155 | 0.364 | 0.247 | 0.034 | 0.174 | 0.534 | 0.566 | -0.237 | -0.094 | 0.145 | 0.284 |
| 8-TH ORDER COEFFICIENT (C) | 0.012 | -0.132 | -0.287 | -0.109 | -0.134 | -0.594 | -1.101 | -0.994 | 0.106 | 0.024 | -0.034 | -0.159 |
| 10-TH ORDER COEFFICIENT (D) | -0.014 | 0.055 | 0.038 | -0.387 | 0.160 | 0.991 | 1.377 | 1.080 | -0.021 | 0.001 | 0.005 | 0.063 |
| 12-TH ORDER COEFFICIENT (E) | 0.013 | -0.012 | 0.093 | 0.836 | -0.073 | -0.765 | -0.804 | -0.630 | 0.002 | -0.002 | 0.000 | -0.016 |
| 14-TH ORDER COEFFICIENT (F) | 0.000 | 0.001 | -0.058 | -0.819 | 0.015 | 0.241 | 0.154 | 0.184 | 0.000 | 0.000 | 0.000 | 0.003 |
| 16-TH ORDER COEFFICIENT (G) | 0.000 | 0.000 | 0.010 | 0.308 | -0.001 | 0.000 | 0.007 | -0.021 | 0.000 | 0.000 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 8

| SURFACE NO. | RADIUS OF CURVATURE | THICKNESS/ DISTANCE | REFRACTIVE INDEX | ABBE NUMBER | REMARK |
|---|---|---|---|---|---|
| Object | Infinity | Infinity | | | |
| 1 | Infinity | 0.030 | | | |
| 2 | 1.35 | 0.653 | 1.546 | 56.1 | FIRST LENS |
| 3 | 6.80 | 0.100 | | | |
| 4 | 5.73 | 0.250 | 1.645 | 23.3 | SECOND LENS |
| 5 | 2.24 | 0.000 | | | |
| 6 | Infinity | 0.276 | | | STOP |
| 7 | 17.27 | 0.299 | 1.546 | 56.1 | THIRD LENS |
| 8 | -10.50 | 0.307 | | | |
| 9 | -2.66 | 0.401 | 1.645 | 23.3 | FOURTH LENS |
| 10 | -3.35 | 0.148 | | | |
| 11 | -30.83 | 0.379 | 1.645 | 23.3 | FIFTH LENS |
| 12 | 48.30 | 0.100 | | | |
| 13 | 1.36 | 0.500 | 1.536 | 55.7 | SIXTH LENS |
| 14 | 1.15 | 0.300 | | | |
| 15 | Infinity | 0.210 | 1.518 | 64.2 | FILTER |
| 16 | Infinity | 0.646 | | | |
| Image | Infinity | 0.000 | | | IMAGING SURFACE |

FIG. 11

| THIRD EXEMPLARY EMBODIMENT | 2 | 3 | 4 | 5 | 7 | 8 | 9 | 10 | 11 | 12 | 13 | 14 |
|---|---|---|---|---|---|---|---|---|---|---|---|---|
| RADIUS OF CURVATURE | 1.348 | 6.796 | 5.733 | 2.243 | 17.273 | -10.497 | -2.664 | -3.348 | -30.827 | 48.303 | 1.359 | 1.150 |
| CONIC CONSTANT (K) | -0.041 | -9.199 | -17.450 | 5.365 | -1.000 | 8.350 | 3.634 | -16.523 | 98.103 | -18.765 | -4.752 | -0.899 |
| 4-TH ORDER COEFFICIENT (A) | 0.006 | -0.090 | -0.190 | -0.176 | -0.138 | -0.141 | -0.184 | -0.270 | 0.179 | 0.089 | -0.328 | -0.451 |
| 6-TH ORDER COEFFICIENT (B) | 0.003 | 0.162 | 0.356 | 0.251 | 0.014 | 0.155 | 0.545 | 0.570 | -0.251 | -0.107 | 0.155 | 0.297 |
| 8-TH ORDER COEFFICIENT (C) | 0.018 | -0.128 | -0.269 | -0.154 | -0.099 | -0.576 | -1.200 | -1.051 | 0.115 | 0.030 | -0.036 | -0.169 |
| 10-TH ORDER COEFFICIENT (D) | -0.021 | 0.052 | 0.023 | -0.216 | 0.136 | 0.999 | 1.604 | 1.194 | -0.024 | 0.000 | 0.005 | 0.063 |
| 12-TH ORDER COEFFICIENT (E) | 0.016 | -0.011 | 0.097 | 0.554 | -0.065 | -0.766 | -1.014 | -0.721 | 0.002 | -0.001 | 0.000 | -0.018 |
| 14-TH ORDER COEFFICIENT (F) | 0.000 | 0.001 | -0.057 | -0.617 | 0.013 | 0.229 | 0.237 | 0.217 | 0.000 | 0.000 | 0.000 | 0.003 |
| 16-TH ORDER COEFFICIENT (G) | 0.000 | 0.000 | 0.010 | 0.258 | -0.001 | 0.000 | -0.304 | -0.026 | 0.000 | 0.000 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 12

| SURFACE NO. | RADIUS OF CURVATURE | THICKNESS/ DISTANCE | REFRACTIVE INDEX | ABBE NUMBER | REMARK |
|---|---|---|---|---|---|
| Object | Infinity | Infinity | | | |
| 1 | Infinity | 0.030 | | | |
| 2 | 1.34 | 0.637 | 1.546 | 56.1 | FIRST LENS |
| 3 | 7.02 | 0.100 | | | |
| 4 | 5.93 | 0.250 | 1.645 | 23.3 | SECOND LENS |
| 5 | 2.23 | 0.000 | | | |
| 6 | Infinity | 0.280 | | | STOP |
| 7 | 16.00 | 0.298 | 1.546 | 56.1 | THIRD LENS |
| 8 | −10.59 | 0.306 | | | |
| 9 | −2.67 | 0.401 | 1.645 | 23.3 | FOURTH LENS |
| 10 | −3.44 | 0.153 | | | |
| 11 | −39.77 | 0.383 | 1.645 | 23.3 | FIFTH LENS |
| 12 | 53.62 | 0.100 | | | |
| 13 | 1.35 | 0.502 | 1.536 | 55.7 | SIXTH LENS |
| 14 | 1.14 | 0.300 | | | |
| 15 | Infinity | 0.210 | 1.518 | 64.2 | FILTER |
| 16 | Infinity | 0.650 | | | |
| Image | Infinity | 0.000 | | | IMAGING SURFACE |

FIG. 15

| FOURTH EXEMPLARY EMBODIMENT | 2 | 3 | 4 | 5 | 7 | 8 | 9 | 10 | 11 | 12 | 13 | 14 |
|---|---|---|---|---|---|---|---|---|---|---|---|---|
| RADIUS OF CURVATURE | 1.342 | 7.019 | 5.934 | 2.225 | 15.999 | -10.587 | -2.671 | -3.442 | -39.769 | 53.624 | 1.355 | 1.141 |
| CONIC CONSTANT (K) | -0.035 | -9.426 | -17.761 | 5.330 | -1.000 | 8.350 | 3.448 | -17.984 | 231.660 | -18.765 | -4.585 | -0.904 |
| 4-TH ORDER COEFFICIENT (A) | 0.006 | -0.093 | -0.198 | -0.183 | -0.141 | -0.141 | -0.177 | -0.263 | 0.177 | 0.088 | -0.329 | -0.451 |
| 6-TH ORDER COEFFICIENT (B) | 0.004 | 0.170 | 0.382 | 0.276 | 0.003 | 0.136 | 0.538 | 0.556 | -0.251 | -0.105 | 0.153 | 0.295 |
| 8-TH ORDER COEFFICIENT (C) | 0.015 | -0.137 | -0.308 | -0.211 | -0.084 | -0.543 | -1.237 | -1.042 | 0.116 | 0.029 | -0.035 | -0.167 |
| 10-TH ORDER COEFFICIENT (D) | -0.017 | 0.057 | 0.057 | -0.124 | 0.128 | 0.953 | 1.722 | 1.201 | -0.025 | 0.000 | 0.005 | 0.067 |
| 12-TH ORDER COEFFICIENT (E) | 0.015 | -0.013 | 0.079 | 0.466 | -0.063 | -0.703 | -1.143 | -0.732 | 0.003 | -0.002 | 0.000 | -0.018 |
| 14-TH ORDER COEFFICIENT (F) | 0.000 | 0.001 | -0.052 | -0.581 | 0.013 | 0.193 | 0.300 | 0.221 | 0.000 | 0.000 | 0.000 | 0.003 |
| 16-TH ORDER COEFFICIENT (G) | 0.000 | 0.000 | 0.009 | 0.254 | -0.001 | 0.000 | -0.016 | -0.026 | 0.000 | 0.000 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 16

| SURFACE NO. | RADIUS OF CURVATURE | THICKNESS/ DISTANCE | REFRACTIVE INDEX | ABBE NUMBER | REMARK |
|---|---|---|---|---|---|
| Object | Infinity | Infinity | | | |
| 1 | Infinity | 0.030 | | | |
| 2 | 1.34 | 0.639 | 1.546 | 56.1 | FIRST LENS |
| 3 | 6.73 | 0.100 | | | |
| 4 | 5.79 | 0.250 | 1.645 | 23.3 | SECOND LENS |
| 5 | 2.21 | 0.000 | | | |
| 6 | Infinity | 0.275 | | | STOP |
| 7 | 17.57 | 0.283 | 1.546 | 56.1 | THIRD LENS |
| 8 | −9.36 | 0.301 | | | |
| 9 | −2.64 | 0.413 | 1.645 | 23.3 | FOURTH LENS |
| 10 | −3.56 | 0.161 | | | |
| 11 | −128.71 | 0.388 | 1.645 | 23.3 | FIFTH LENS |
| 12 | 59.26 | 0.100 | | | |
| 13 | 1.38 | 0.499 | 1.536 | 55.7 | SIXTH LENS |
| 14 | 1.14 | 0.300 | | | |
| 15 | Infinity | 0.210 | 1.518 | 64.2 | FILTER |
| 16 | Infinity | 0.651 | | | |
| Image | Infinity | 0.000 | | | IMAGING SURFACE |

FIG. 19

| FIFTH EXEMPLARY EMBODIMENT | 2 | 3 | 4 | 5 | 7 | 8 | 9 | 10 | 11 | 12 | 13 | 14 |
|---|---|---|---|---|---|---|---|---|---|---|---|---|
| RADIUS OF CURVATURE | 1.337 | 6.730 | 5.788 | 2.209 | 17.574 | -9.356 | -2.639 | -3.557 | -28.714 | 59.259 | 1.381 | 1.145 |
| CONIC CONSTANT (K) | -0.033 | -9.426 | -17.761 | 5.285 | -1.000 | 8.350 | 3.277 | -17.984 | 0.000 | -18.765 | -4.346 | -0.902 |
| 4-TH ORDER COEFFICIENT (A) | 0.006 | -0.095 | -0.200 | -0.183 | -0.144 | -0.142 | -0.165 | -0.248 | 0.160 | 0.088 | -0.330 | -0.444 |
| 6-TH ORDER COEFFICIENT (B) | 0.004 | 0.172 | 0.383 | 0.273 | -0.012 | 0.108 | 0.499 | 0.499 | -0.236 | -0.107 | 0.154 | 0.287 |
| 8-TH ORDER COEFFICIENT (C) | 0.017 | -0.137 | -0.305 | -0.195 | -0.073 | -0.473 | -1.185 | -0.933 | 0.109 | 0.032 | -0.035 | -0.160 |
| 10-TH ORDER COEFFICIENT (D) | -0.020 | 0.057 | 0.052 | -0.169 | 0.130 | 0.826 | 1.720 | 1.085 | -0.023 | -0.001 | 0.005 | 0.064 |
| 12-TH ORDER COEFFICIENT (E) | 0.017 | -0.012 | 0.082 | 0.542 | -0.066 | -0.544 | -1.183 | -0.664 | 0.002 | -0.001 | 0.000 | -0.017 |
| 14-TH ORDER COEFFICIENT (F) | 0.000 | 0.001 | -0.052 | -0.646 | 0.014 | 0.115 | 0.326 | 0.201 | 0.000 | 0.000 | 0.000 | 0.003 |
| 16-TH ORDER COEFFICIENT (G) | 0.000 | 0.000 | 0.009 | 0.276 | -0.001 | 0.000 | -0.021 | -0.024 | 0.000 | 0.000 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 20

| SURFACE NO. | RADIUS OF CURVATURE | THICKNESS/ DISTANCE | REFRACTIVE INDEX | ABBE NUMBER | REMARK |
|---|---|---|---|---|---|
| Object | Infinity | Infinity | | | |
| 1 | Infinity | −0.150 | | | |
| 2 | 1.39 | 0.697 | 1.546 | 56.1 | FIRST LENS |
| 3 | 30.40 | 0.100 | | | |
| 4 | 14.71 | 0.171 | 1.645 | 23.3 | SECOND LENS |
| 5 | 2.41 | 0.000 | | | |
| 6 | Infinity | 0.251 | | | STOP |
| 7 | 5.98 | 0.419 | 1.546 | 56.1 | THIRD LENS |
| 8 | 27.87 | 0.227 | | | |
| 9 | −4.01 | 0.375 | 1.645 | 23.3 | FOURTH LENS |
| 10 | −4.65 | 0.143 | | | |
| 11 | 5.79 | 0.493 | 1.645 | 23.3 | FIFTH LENS |
| 12 | 4.87 | 0.150 | | | |
| 13 | 1.98 | 0.521 | 1.546 | 56.1 | SIXTH LENS |
| 14 | 1.48 | 0.300 | | | |
| 15 | Infinity | 0.210 | 1.518 | 64.2 | FILTER |
| 16 | Infinity | 0.829 | | | |
| Image | Infinity | 0.000 | | | IMAGING SURFACE |

FIG. 23

| SIXTH EXEMPLARY EMBODIMENT | 2 | 3 | 4 | 5 | 7 | 8 | 9 | 10 | 11 | 12 | 13 | 14 |
|---|---|---|---|---|---|---|---|---|---|---|---|---|
| RADIUS OF CURVATURE | 1.393 | 30.400 | 14.709 | 2.415 | 5.984 | 27.868 | -4.010 | -4.651 | 5.795 | 4.869 | 1.984 | 1.481 |
| CONIC CONSTANT (K) | 0.016 | -10.000 | -23.320 | 1.413 | 20.240 | 3.224 | -0.109 | 6.991 | -10.000 | 2.198 | -1.040 | -0.734 |
| 4-TH ORDER COEFFICIENT (A) | -0.001 | -0.004 | -0.089 | -0.111 | -0.151 | -0.124 | -0.108 | -0.148 | -0.063 | -0.050 | -0.386 | -0.333 |
| 6-TH ORDER COEFFICIENT (B) | 0.006 | 0.115 | 0.483 | 0.496 | 0.121 | 0.116 | 0.248 | 0.281 | 0.007 | -0.008 | 0.219 | 0.185 |
| 8-TH ORDER COEFFICIENT (C) | -0.005 | -0.185 | -0.954 | -0.996 | -0.410 | -0.294 | -0.253 | -0.188 | -0.010 | 0.001 | -0.099 | -0.090 |
| 10-TH ORDER COEFFICIENT (D) | 0.005 | 0.142 | 1.129 | 1.561 | 0.830 | 0.344 | 0.057 | 0.076 | 0.005 | -0.001 | 0.035 | 0.029 |
| 12-TH ORDER COEFFICIENT (E) | -0.002 | -0.057 | -0.739 | -1.481 | -1.016 | -0.303 | 0.007 | -0.019 | -0.001 | 0.000 | -0.008 | -0.006 |
| 14-TH ORDER COEFFICIENT (F) | 0.000 | 0.009 | 0.205 | 0.755 | 0.599 | 0.153 | 0.000 | 0.002 | 0.000 | 0.000 | 0.001 | 0.001 |
| 16-TH ORDER COEFFICIENT (G) | 0.000 | 0.000 | 0.000 | 0.000 | 0.000 | 0.000 | 0.000 | 0.000 | 0.000 | 0.000 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 24

LENS MODULE

CROSS-REFERENCE TO RELATED APPLICATION

This application claims the priority and benefit of Korean Patent Application No. 10-2014-0126161 filed on Sep. 22, 2014, with the Korean Intellectual Property Office, the disclosure of which is incorporated herein by reference.

BACKGROUND

The present disclosure relates to a lens module having an optical system including six lenses.

A lens module mounted in a camera unit of a mobile terminal includes a plurality of lenses. Here, the lens module includes six lenses in order to configure an optical system having high resolution.

However, when an optical system having high resolution is configured using a plurality of lenses as described above, a focal length (a distance from an object-side surface of a first lens to an imaging surface) of the optical system may be increased. In this case, it may be difficult to mount the lens module in a thinned mobile terminal. Therefore, the development of a lens module having a decreased overall length has been demanded.

For reference, Patent Documents 1 and 2 disclose a lens module according to the related art.

RELATED ART DOCUMENT (Patent Document 1) US2013-215301 A1
(Patent Document 2) US2012-243108 A1

SUMMARY

An aspect of the present disclosure may provide a lens module having high resolution.

According to an aspect of the present disclosure, a lens module may include: a first lens having positive refractive power; a second lens having negative refractive power; a third lens having positive refractive power; a fourth lens having refractive power and having a convex image-side surface; a fifth lens having negative refractive power; and a sixth lens having refractive power and having one or more inflection point on an image-side surface thereof.

BRIEF DESCRIPTION OF DRAWINGS

The above and other aspects, features and advantages of the present disclosure will be more clearly understood from the following detailed description taken in conjunction with the accompanying drawings, in which:

FIG. 3 is a table illustrating respective characteristics of lenses in the lens module shown in FIG. 1;

FIG. 4 is a table illustrating respective aspherical surface coefficients of the lenses in the lens module shown in FIG. 1;

FIG. 7 is a table illustrating respective characteristics of the lenses in the lens module shown in FIG. 5;

FIG. 8 is a table illustrating respective aspherical surface coefficients of the lenses in the lens module shown in FIG. 5;

FIG. 11 is a table illustrating respective characteristics of lenses in the lens module shown in FIG. 9;

FIG. 12 is a table illustrating respective aspherical surface coefficients of the lenses in the lens module shown in FIG. 9;

FIG. 15 is a table illustrating respective characteristics of lenses in the lens module shown in FIG. 13;

FIG. 16 is a table illustrating respective aspherical surface coefficients of the lenses in the lens module shown in FIG. 13;

FIG. 19 is a table illustrating respective characteristics of lenses in the lens module shown in FIG. 17;

FIG. 20 is a table illustrating respective aspherical surface coefficients of the lenses in the lens module shown in FIG. 17;

FIG. 23 is a table illustrating respective characteristics of lenses in the lens module shown in FIG. 21; and FIG. 24 is a table illustrating respective aspherical surface coefficients of the lenses in the lens module shown in FIG. 21.

DETAILED DESCRIPTION

Figure 1:
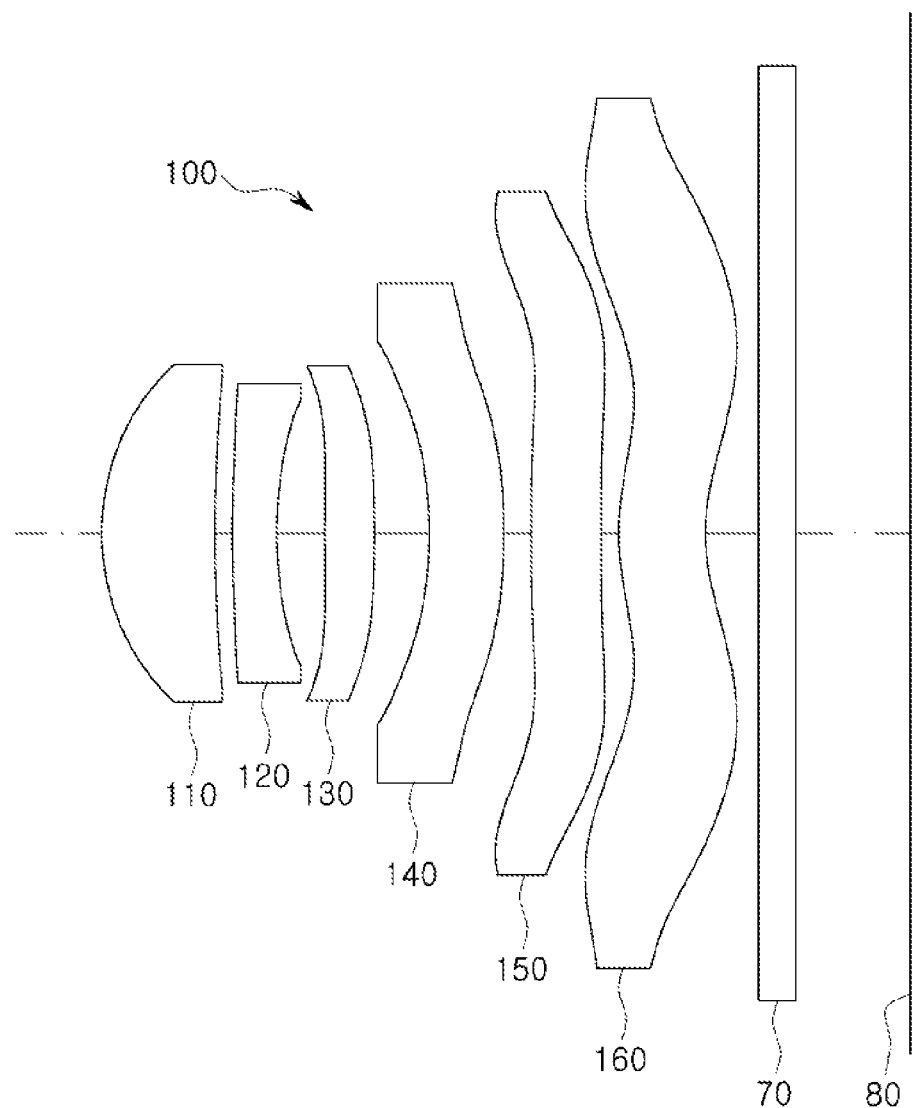
FIG. 1 is a configuration diagram of a lens module according to a first exemplary embodiment in the present disclosure.

Exemplary embodiments of the present disclosure will now be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

In addition, in the present specification, a first lens refers to a lens that is the closest to an object (or a subject), and a sixth lens refers to a lens that is the closest to an imaging surface (or an image sensor). Further, the term 'first surface of a lens' refers to a direction from the lens module toward the object (or the subject), while the term 'second surface of a lens' refers to a direction from the lens module toward the imaging surface (or the image sensor). In addition, in the present specification, all numerical values of radii of curvature and thicknesses of the lenses, an overall length (OAL) (a distance from a first surface of the first lens to the imaging surface in an optical axis direction), ImgHs (maximum image size of the image sensor), and a back focus length (BFL), an overall focal length of an optical system, and a focal length of each lens may be represented by millimeters (mm). In addition, the thicknesses of the lenses, gaps between the lenses, the OAL, and the BFL are distances measured on the basis of the optical axis of the lenses. Further, with regard to a shape of the lens, when a surface of the lens is convex, it means that a portion of the corresponding surface on the optical axis is convex, and when a surface of the lens is concave, it means that a portion of the corresponding surface on the optical axis is concave. Therefore, in a case in which one surface of the lens is convex, an edge portion of the corresponding lens may be concave. Likewise, in a case in which one surface of the lens is concave, an edge portion of the lens may be convex. A lens module may include an optical system including a plurality of lenses. As an example, the optical system of the lens module may include six lenses having refractive power. However, the lens module is not limited to including only the six lenses. For example, the lens module may include a stop controlling an amount of light. In addition, the lens module may further include an infrared cut-off filter filtering infrared light. Further, the lens module may further include an image sensor (that is, an imaging device) converting an image of a subject incident through the optical system into an electrical signal. Further, the lens module may further include a gap maintaining member adjusting a gap between lenses.

First to sixth lenses may be formed of materials having a refractive index different from that of air. For example, the first to sixth lenses may be formed of plastic or glass. At least one of the first to sixth lenses may have an aspherical surface. As an example, only the sixth lens among the first to sixth lenses may have an aspherical surface. As another example, at least one surface of all of the first to sixth lenses may be aspherical. Here, the aspherical surface of each lens may be represented by the following Equation 1.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}$$ [Equation 1]

Here, c is the inverse of a radius of curvature of a corresponding lens, K is a conic constant, and r is a distance from a certain point on the aspherical surface of the lens to an optical axis in a direction perpendicular to the optical axis. In addition, constants A to J sequentially refer to 4-th order to 20-th order aspherical surface coefficients. In addition, Z is a distance between the certain point on the aspherical surface at the distance r and a tangential plane meeting the apex of the aspherical surface of the lens.

The optical system configuring the lens module may have F No. of 2.1 or less. In this case, the subject may be clearly imaged. For example, the lens module according to exemplary embodiments may clearly capture an image of the subject even under a low illumination condition (for example, 100 lux or less).

The optical system of the lens module may satisfy the following Conditional Expression:

$0.0<f1/f<0.9$ [Conditional Expression]

Here, f is an overall focal length [mm] of the lens module, and f1 is a focal length [mm] of the first lens. The above Conditional Expression is a numerical condition for optimizing refractive power of the first lens. For example, the first lens that is out of the lower limit value may have strong refractive power to limit optical designs of the second to fifth lenses, and the first lens that is out of the upper limit value may have low refractive power, which may be disadvantageous in miniaturizing the lens module.

The Optical System of the Lens Module May Satisfy the Following Conditional Expressions:

$20<V1-V2<40$ [Conditional Expression]

$20<V1-V4<40$ [Conditional Expression]

$20<V1-V5<40$ [Conditional Expression]

Here, V1 is an Abbe number of the first lens, V2 is an Abbe number of the second lens, V4 is an Abbe number of the fourth lens, and V5 is an Abbe number of the fifth lens.

The above Conditional Expressions may be conditions for facilitating an optical design of the first lens. For example, since the second lens, the fourth lens, and the fifth lens satisfying the above Conditional Expressions have a refractive index higher than that of the first lens, they may be manufactured in various forms while ensuring a degree of freedom in a design of the first lens.

The second to fifth lenses of the optical system configuring the lens module may satisfy the following Conditional Expressions:

$-2.0<f2/f<0.0$ [Conditional Expression]

$0.0<f3/f<6.0$ [Conditional Expression]

$f4/f<-2.0$ [Conditional Expression]

$f5/f<-5.0$ [Conditional Expression]

Here, f2 is a focal length [mm] of the second lens, f3 is a focal length [mm] of the third lens, f4 is a focal length [mm] of the fourth lens, f5 is a focal length [mm] of the fifth lens, and f is the overall focal length [mm] of the lens module.

The above Conditional Expressions may provide refractive power ranges of the second to fifth lenses that are advantageous in shortening a length of the optical system.

The optical system of the lens module may satisfy the following Conditional Expression:

$OAL/f<1.5$ [Conditional Expression]

Here, OAL is a distance [mm] from an object-side surface of the first lens to an imaging surface, and f is the overall focal length [mm] of the lens module.

The first to third lenses of the optical system configuring the lens module may satisfy the following Conditional Expressions:

$-0.8<f1/f2<0.0$ [Conditional Expression]

$-0.8<f2/f3<0.8$ [Conditional Expression]

Here, f1 is the focal length [mm] of the first lens, and f2 is the focal length [mm] of the second lens, and f3 is the focal length [mm] of the third lens.

The above Conditional Expressions may be conditions for optimizing optical designs of the first to third lenses. For example, when the second lens is designed in a range in which all of the above Conditional Expressions are satisfied, degrees of freedom of the first and third lenses may be increased. That is, the first and third lenses may be variously modified.

The optical system of the lens module may satisfy the following Conditional Expressions:

$BFL/f<0.5$                                    [Conditional Expression]

$D12/f<0.1$                                  [Conditional Expression]

$0.25<r1/f$                                  [Conditional Expression]

$r5/f<0.7$                                    [Conditional Expression]

$r8/f<-0.6$                                  [Conditional Expression]

Here, BFL is a distance [mm] of an image-side surface of the sixth lens to the imaging surface, D12 is an air interval [mm] between the first and second lenses, r1 is a radius of curvature [mm] of the object-side surface of the first lens, r5 is a radius of curvature [mm] of an object-side surface of the third lens, r8 is a radius of curvature [mm] of an image-side surface of the fourth lens, and f is the overall focal length [mm] of the lens module.

The above Conditional Expressions may be conditions for optimizing sizes of BFL, D12, r1, r5, and r8 having an influence on the overall focal length of the optical system.

The optical system of the lens module may satisfy the following Conditional Expression:

$(EPD/2)/f12<1.0$                     [Conditional Expression]

Here, EPD/2 is a radius [mm] of an entrance pupil diameter (EPD), and f12 is a composite focal length [mm] of the first and second lenses.

Next, the optical system configuring the lens module will be described.

The optical system of the lens module may include the first to sixth lenses. For example, the optical system of the lens module may include six lenses having refractive power.

The first lens may have refractive power. For example, the first lens may have positive refractive power.

The first lens may have a first surface (object-side surface) that is convex. As an example, the first surface of the first lens may be convex, and a second surface (image-side surface) thereof may be concave. The first lens may have an aspherical surface. For example, both surfaces of the first lens may be aspherical. The first lens may be formed of a material having high light transmissivity and excellent workability. For example, the first lens may be formed of plastic. However, a material of the first lens is not limited to the plastic. For example, the first lens may be formed of glass.

The second lens may have refractive power. For example, the second lens may have negative refractive power. The second lens may be convex toward the object. As an example, a first surface of the second lens may be convex toward the object, and a second surface thereof may be concave. The second lens may have an aspherical surface. For example, both surfaces of the second lens may be aspherical. The second lens may be formed of a material having high light transmissivity and excellent workability. For example, the second lens may be formed of plastic. However, a material of the second lens is not limited to the plastic. For example, the second lens may be formed of glass.

The second lens may be formed of a material having a high refractive index. For example, the second lens may be formed of a material having a refractive index of 1.60 or more (in this case, the second lens may have an Abbe number of 30 or less). The second lens formed of this material may be easily manufactured and may be advantageous in lowering a defect rate resulting from manufacturing tolerance. In addition, the second lens formed of this material may decrease a distance between lenses, such that it may be advantageous in miniaturizing the lens module.

The third lens may have refractive power. For example, the third lens may have positive refractive power. In addition, the third lens may have refractive power (for reference, refractive power is an inverse number of a focal length) lower than that of the first lens. For example, the third lens may satisfy the following Conditional Expressions:

$f1<f3$                                      [Conditional Expression]

Here, f1 is a focal length of the first lens, and f3 is a focal length of the third lens.

One surface of the third lens may be convex. As an example, one of first and second surfaces of the third lens may be convex. The third lens may have an aspherical surface. For example, both surfaces of the third lens may be aspherical. The third lens may be formed of a material having high light transmissivity and excellent workability. For example, the third lens may be formed of plastic. However, a material of the third lens is not limited to the plastic. For example, the third lens may be formed of glass.

The fourth lens may have refractive power. For example, the fourth lens may have negative refractive power. The fourth lens may be convex toward the image. For example, a first surface of the fourth lens may be concave, and a second surface thereof may be convex. The fourth lens may have an aspherical surface. For example, both surfaces of the fourth lens may be aspherical. The fourth lens may be formed of a material having high light transmissivity and excellent workability. For example, the fourth lens may be formed of plastic. However, a material of the fourth lens is not limited to the plastic. For example, the fourth lens may be formed of glass.

The fourth lens may be formed of a material having a high refractive index. For example, the fourth lens may be formed of a material having a refractive index of 1.60 or more (in this case, the fourth lens may have an Abbe number of 30 or less). The fourth lens formed of this material may be easily manufactured and may be advantageous in lowering a defect rate resulting from manufacturing tolerance. In addition, the fourth lens formed of this material may decrease a distance between lenses, such that it may be advantageous in miniaturizing the lens module.

The fifth lens may have refractive power. For example, the fifth lens may have negative refractive power. One surface of the fifth lens may be concave. As an example, a first surface or a second surface of the fifth lens may be concave. The fifth lens may have an aspherical surface. For example, both surfaces of the fifth lens may be aspherical. The fifth lens may be formed of a material having high light transmissivity and excellent workability. For example, the fifth lens may be formed of plastic. However, a material of the fifth lens is not limited to the plastic. For example, the fifth lens may be formed of glass.

The fifth lens may be formed of a material having a high refractive index. For example, the fifth lens may be formed of a material having a refractive index of 1.60 or more (in this case, the fifth lens may have an Abbe number of 30 or less). The fifth lens formed of this material may be easily manufactured and may be advantageous in lowering a defect rate resulting from manufacturing tolerance. In addition, the fifth lens formed of this material may decrease a distance between lenses, such that it may be advantageous in miniaturizing the lens module.

The sixth lens may have refractive power. For example, the sixth lens may have negative refractive power.

The sixth lens may be convex toward the object. As an example, a first lens of the sixth lens may be convex, and a second surface thereof may be concave. The sixth lens may have an aspherical surface. For example, both surfaces of the sixth lens may be aspherical. The sixth lens may include an inflection point. For example, the first surface of the sixth lens may be convex at the center of an optical axis, be concave in the vicinity of the optical axis, and be again convex at an edge thereof. Likewise, the second surface of the sixth lens may be concave at the center of an optical axis and become convex toward an edge thereof. The sixth lens may be formed of a material having high light transmissivity and excellent workability. For example, the sixth lens may be formed of plastic. However, a material of the sixth lens is not limited to the plastic. For example, the sixth lens may be formed of glass.

The optical system including the lenses as described above may be configured to have a low F No. For example, the optical system of the lens module may have F No. of 2.1 or less. The optical system of the lens module may be configured to have a relatively short length (OAL). For example, an OAL of the lens module may be 5.0 [mm] or less.

The lens module configured as described above may improve aberration, which causes image quality deterioration. In addition, the lens module as described above may be advantageous in implementing high resolution. Further, the lens module configured as described above may be easily lightened and be advantageous in decreasing a manufacturing cost.

A lens module according to a first exemplary embodiment in the present disclosure will be described with reference to FIG. 1.

A lens module 100 may include an optical system including a first lens 110, a second lens 120, a third lens 130, a fourth lens 140, a fifth lens 150, and a sixth lens 160. In addition, the lens module 100 may further include an infrared cut-off filter 70 and an image sensor 80. Further, the lens module 100 may further include a stop. For example, the stop may be disposed between the second and third lenses.

In the present exemplary embodiment, the first lens 110 may have positive refractive power and have an object-side surface that is convex and an image-side surface that is concave. The second lens 120 may have negative refractive power and have an object-side surface that is convex and an image-side surface that is concave. The third lens 130 may have positive refractive power and have an object-side surface that is convex and an image-side surface that is convex. The fourth lens 140 may have negative refractive power and have an object-side surface that is concave and an image-side surface that is convex. The fifth lens 150 may have negative refractive power and have an object-side surface that is convex and an image-side surface that is concave. The sixth lens 160 may have negative refractive power and have an object-side surface that is convex and an image-side surface that is concave. In addition, the sixth lens may have one or more inflection point formed on each of the object-side surface and the image-side surface thereof.

Aberration characteristics of the lens module will be described with reference to FIG. 2.

Figure 2:
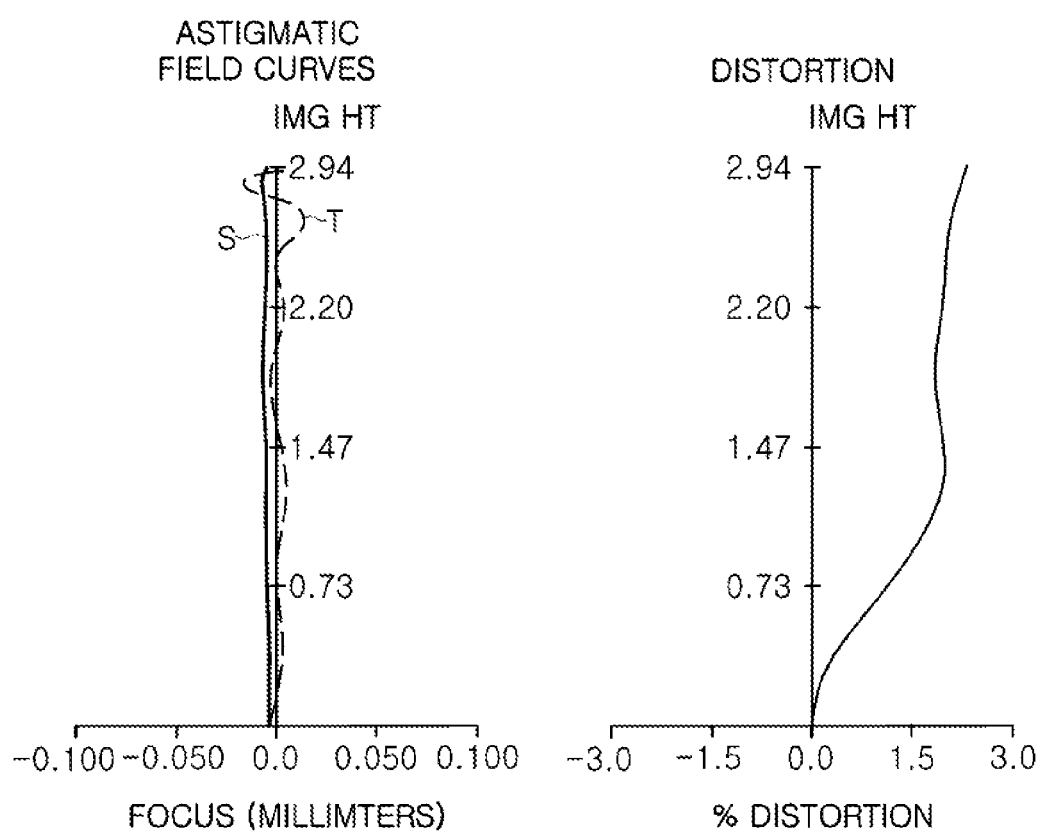
FIG. 2 is graphs having curves representing aberration characteristics of the lens module shown in FIG. 1.

The lens module may have astigmatism and distortion curves as shown in FIG. 2.

Characteristics of the optical system configuring the lens module will be described with reference to FIG. 3.

In FIG. 3, Surface Nos. 2 and 3 indicate first and second surfaces of the first lens, and Surface Nos. 4 and 5 indicate first and second surfaces of the second lens. In a similar scheme, Surface Nos. 7 to 14 indicate first and second surfaces of the third to sixth lenses, respectively. Meanwhile, Surface No. 6 indicates the stop, and Surface Nos. 15 and 16 indicate first and second surfaces of the infrared cut-off filter.

Aspherical surface values of the optical system configuring the lens module will be described with reference to FIG. 4.

In FIG. 4, a horizontal axis means Surface Nos. of the first to sixth lenses, and a vertical axis means characteristics corresponding to each surface of the lenses.

Figure 5:
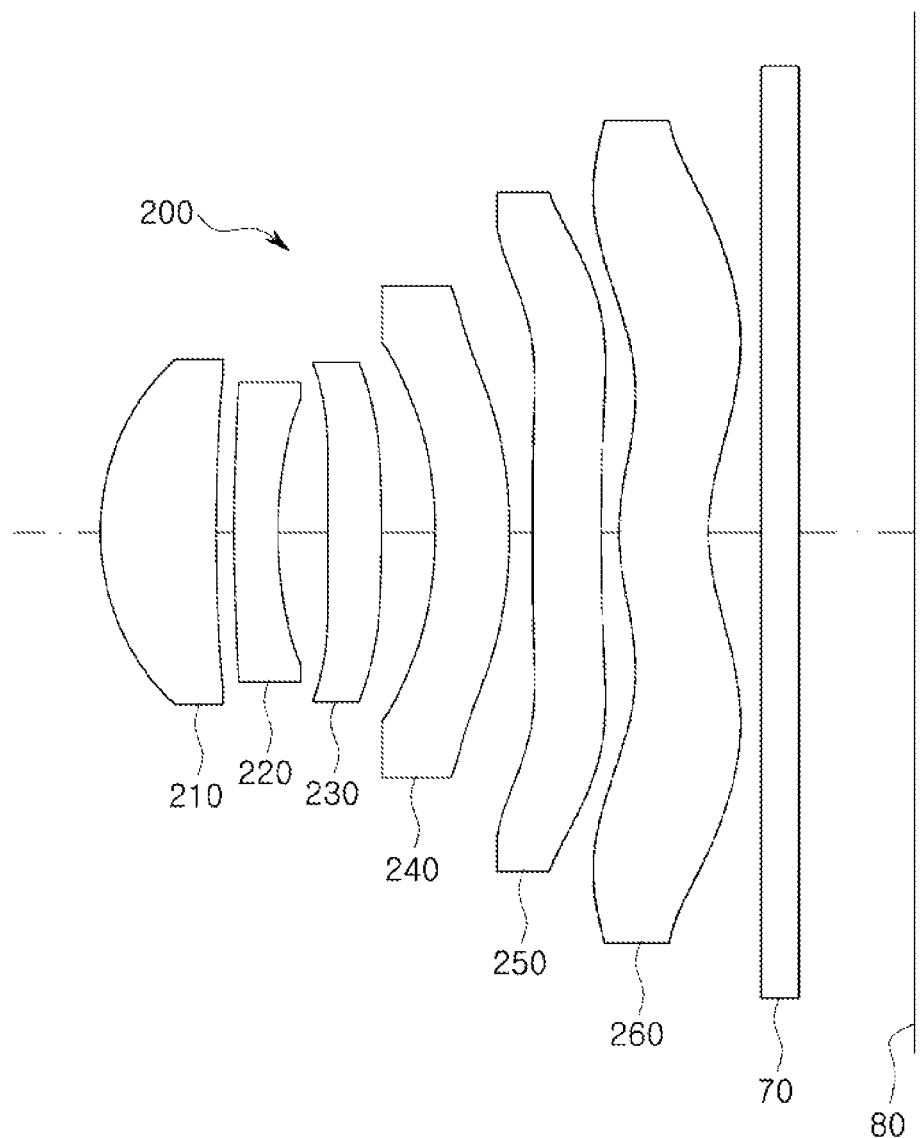
FIG. 5 is a configuration diagram of a lens module according to a second exemplary embodiment in the present disclosure.

A lens module according to a second exemplary embodiment in the present disclosure will be described with reference to FIG. 5.

A lens module 200 may include an optical system including a first lens 210, a second lens 220, a third lens 230, a fourth lens 240, a fifth lens 250, and a sixth lens 260. In addition, the lens module 200 may further include an infrared cut-off filter 70 and an image sensor 80. Further, the lens module 200 may further include a stop. For example, the stop may be disposed between the second and third lenses.

In the present exemplary embodiment, the first lens 210 may have positive refractive power and have an object-side surface that is convex and an image-side surface that is concave. The second lens 220 may have negative refractive power and have an object-side surface that is convex and an image-side surface that is concave. The third lens 230 may have positive refractive power and have an object-side surface that is convex and an image-side surface that is convex. The fourth lens 240 may have negative refractive power and have an object-side surface that is concave and an image-side surface that is convex. The fifth lens 250 may have negative refractive power and have an object-side surface that is concave and an image-side surface that is concave. The sixth lens 260 may have negative refractive power and have an object-side surface that is convex and an image-side surface that is concave. In addition, the sixth lens may have one or more inflection point formed on each of the object-side surface and the image-side surface thereof.

Aberration characteristics of the lens module will be described with reference to FIG. 6.

Figure 6:
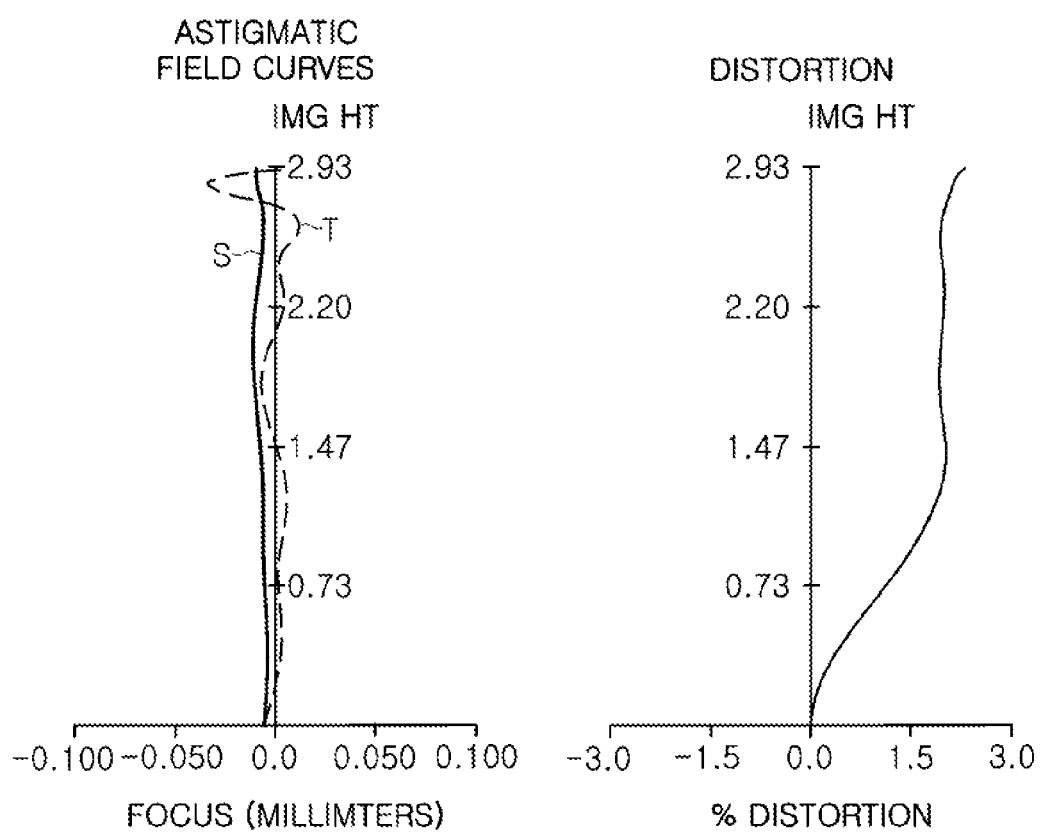
FIG. 6 is graphs having curves representing aberration characteristics of lenses in the lens module shown in FIG. 5.

The lens module may have astigmatism and distortion curves as shown in FIG. 6.

Characteristics of the optical system configuring the lens module will be described with reference to FIG. 7.

In FIG. 7, Surface Nos. 2 and 3 indicate first and second surfaces of the first lens, and Surface Nos. 4 and 5 indicate first and second surfaces of the second lens. In a similar scheme, Surface Nos. 7 to 14 indicate first and second surfaces of the third to sixth lenses, respectively. Meanwhile, Surface No. 6 indicates the stop, and Surface Nos. 15 and 16 indicate first and second surfaces of the infrared cut-off filter.

Aspherical surface values of the optical system configuring the lens module will be described with reference to FIG. 8.

In FIG. 8, a horizontal axis means Surface Nos. of the first to sixth lenses, and a vertical axis means characteristics corresponding to each surface of the lenses.

Figure 9:
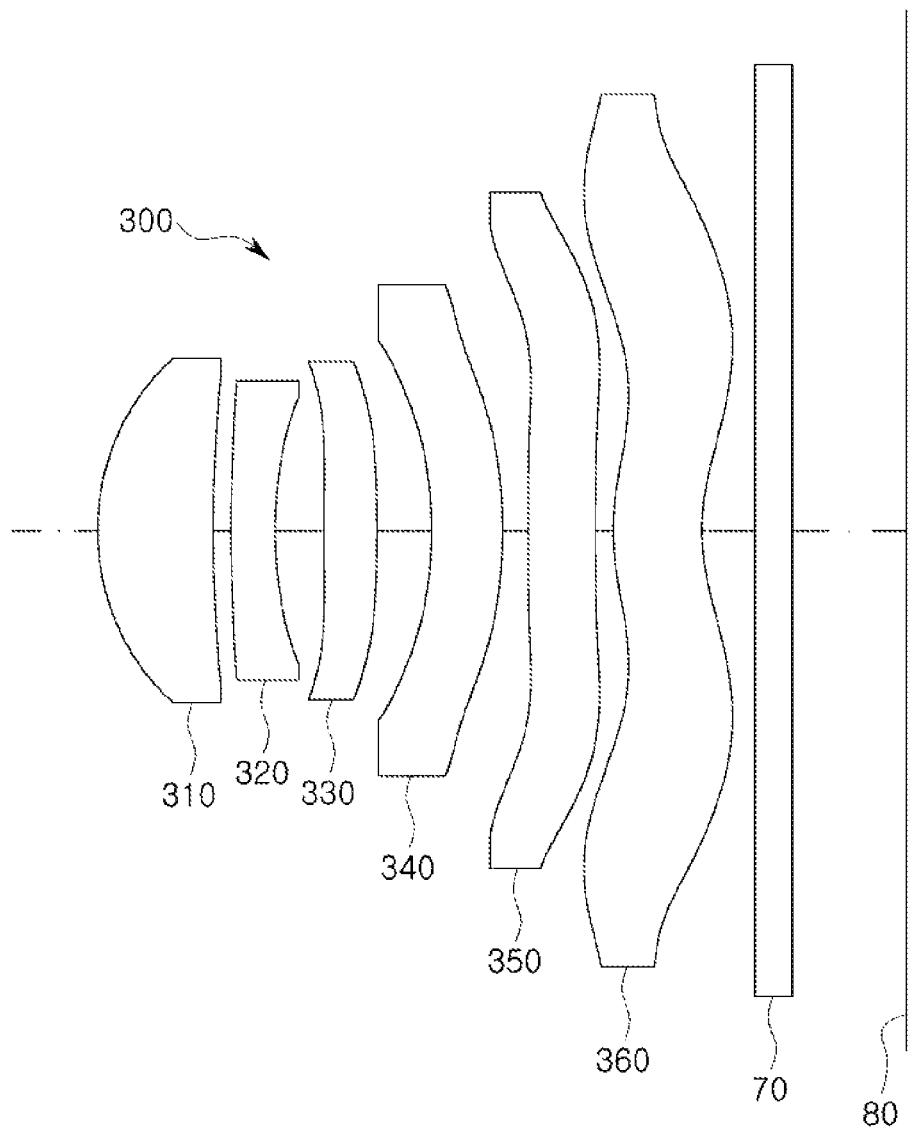
FIG. 9 is a configuration diagram of a lens module according to a third exemplary embodiment in the present disclosure.

A lens module according to a third exemplary embodiment in the present disclosure will be described with reference to FIG. 9.

A lens module 300 may include an optical system including a first lens 310, a second lens 320, a third lens 330, a fourth lens 340, a fifth lens 350, and a sixth lens 360. In addition, the lens module 300 may further include an infrared cut-off filter 70 and an image sensor 80. Further, the lens module 300 may further include a stop. For example, the stop may be disposed between the second and third lenses.

In the present exemplary embodiment, the first lens 310 may have positive refractive power and have an object-side surface that is convex and an image-side surface that is concave. The second lens 320 may have negative refractive power and have an object-side surface that is convex and an image-side surface that is concave. The third lens 330 may have positive refractive power and have an object-side surface that is convex and an image-side surface that is convex. The fourth lens 340 may have negative refractive power and have an object-side surface that is concave and an image-side surface that is convex. The fifth lens 350 may have negative refractive power and have an object-side surface that is concave and an image-side surface that is concave. The sixth lens 360 may have negative refractive power and have an object-side surface that is convex and an image-side surface that is concave. In addition, the sixth lens may have one or more inflection point formed on each of the object-side surface and the image-side surface thereof.

Aberration characteristics of the lens module will be described with reference to FIG. 10.

Figure 10:
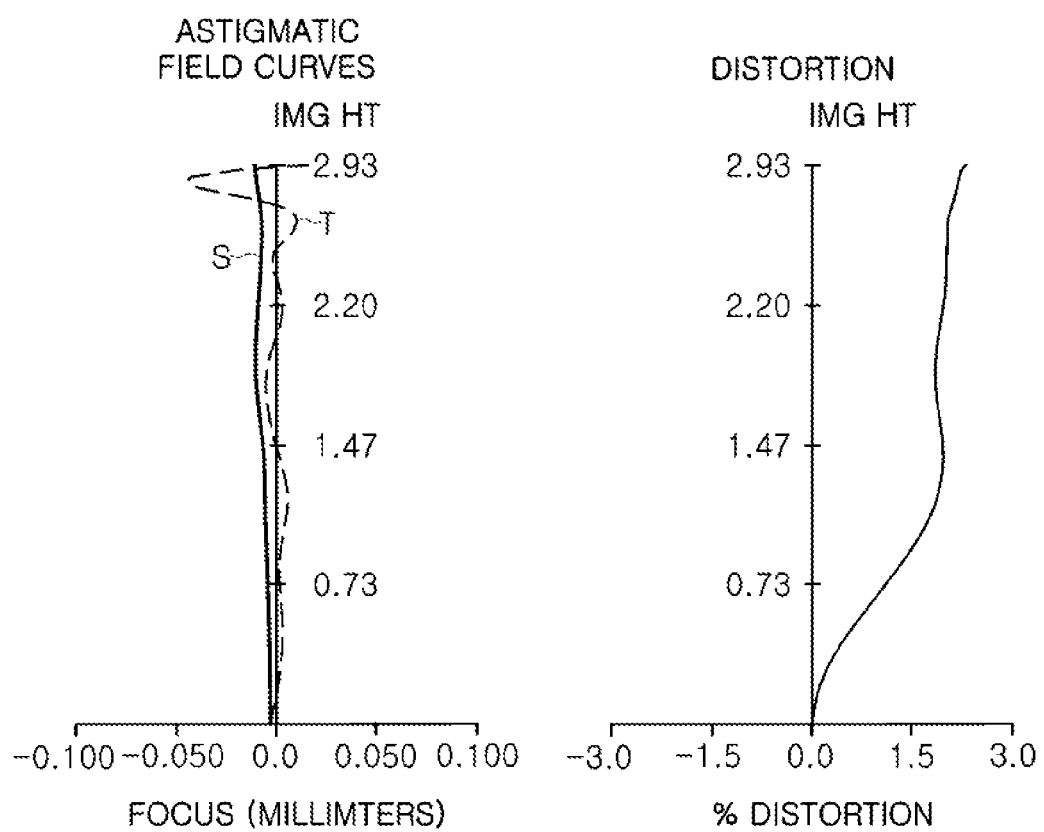
FIG. 10 is graphs having curves representing aberration characteristics of the lens module shown in FIG. 9.

The lens module may have astigmatism and distortion curves as shown in FIG. 10.

Characteristics of the optical system configuring the lens module will be described with reference to FIG. 11.

In FIG. 11, Surface Nos. 2 and 3 indicate first and second surfaces of the first lens, and Surface Nos. 4 and 5 indicate first and second surfaces of the second lens. In a similar scheme, Surface Nos. 7 to 14 indicate first and second surfaces of the third to sixth lenses, respectively. Meanwhile, Surface No. 6 indicates the stop, and Surface Nos. 15 and 16 indicate first and second surfaces of the infrared cut-off filter.

Aspherical surface values of the optical system configuring the lens module will be described with reference to FIG. 12.

In FIG. 12, a horizontal axis means Surface Nos. of the first to sixth lenses, and a vertical axis means characteristics corresponding to each surface of the lenses.

Figure 13:
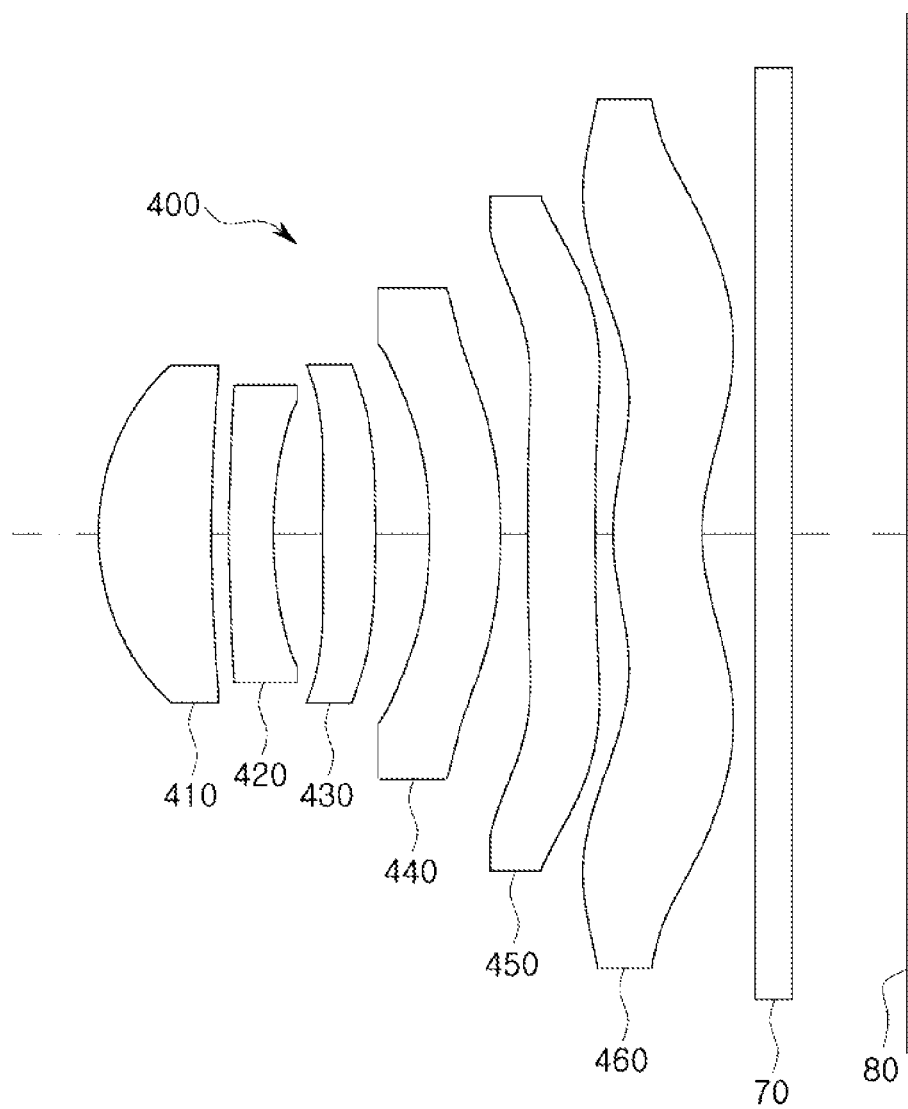
FIG. 13 is a configuration diagram of a lens module according to a fourth exemplary embodiment in the present disclosure.

A lens module according to a fourth exemplary embodiment in the present disclosure will be described with reference to FIG. 13.

A lens module 400 may include an optical system including a first lens 410, a second lens 420, a third lens 430, a fourth lens 440, a fifth lens 450, and a sixth lens 460. In addition, the lens module 400 may further include an infrared cut-off filter 70 and an image sensor 80. Further, the lens module 400 may further include a stop. For example, the stop may be disposed between the second and third lenses.

In the present exemplary embodiment, the first lens 410 may have positive refractive power and have an object-side surface that is convex and an image-side surface that is concave. The second lens 420 may have negative refractive power and have an object-side surface that is convex and an image-side surface that is concave. The third lens 430 may have positive refractive power and have an object-side surface that is convex and an image-side surface that is convex. The fourth lens 440 may have negative refractive power and have an object-side surface that is concave and an image-side surface that is convex. The fifth lens 450 may have negative refractive power and have an object-side surface that is concave and an image-side surface that is concave. The sixth lens 460 may have negative refractive power and have an object-side surface that is convex and an image-side surface that is concave. In addition, the sixth lens may have one or more inflection point formed on each of the object-side surface and the image-side surface thereof.

Aberration characteristics of the lens module will be described with reference to FIG. 14.

Figure 14:
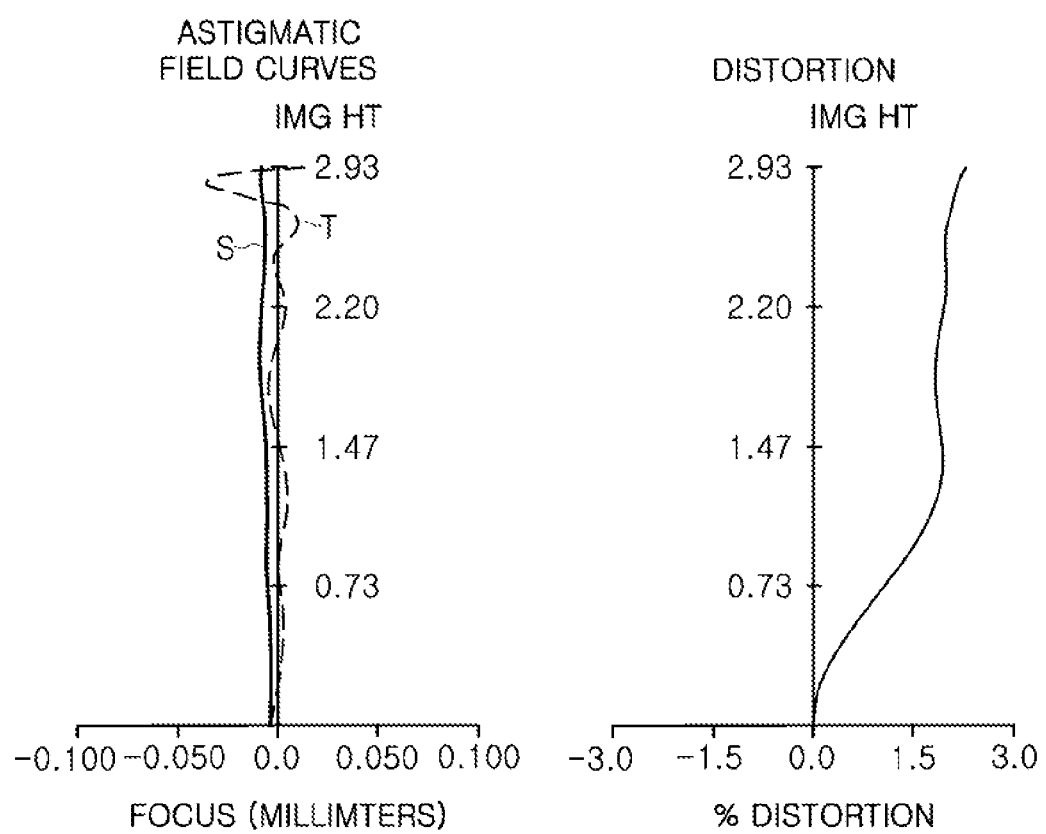
FIG. 14 is graphs having curves representing aberration characteristics of the lens module shown in FIG. 13.

The lens module may have astigmatism and distortion curves as shown in FIG. 14.

Characteristics of the optical system configuring the lens module will be described with reference to FIG. 15.

In FIG. 15, Surface Nos. 2 and 3 indicate first and second surfaces of the first lens, and Surface Nos. 4 and 5 indicate first and second surfaces of the second lens. In a similar scheme, Surface Nos. 7 to 14 indicate first and second surfaces of the third to sixth lenses, respectively. Meanwhile, Surface No. 6 indicates the stop, and Surface Nos. 15 and 16 indicate first and second surfaces of the infrared cut-off filter.

Aspherical surface values of the optical system configuring the lens module will be described with reference to FIG. 16.

In FIG. 16, a horizontal axis means Surface Nos. of the first to sixth lenses, and a vertical axis means characteristics corresponding to each surface of the lenses.

Figure 17:
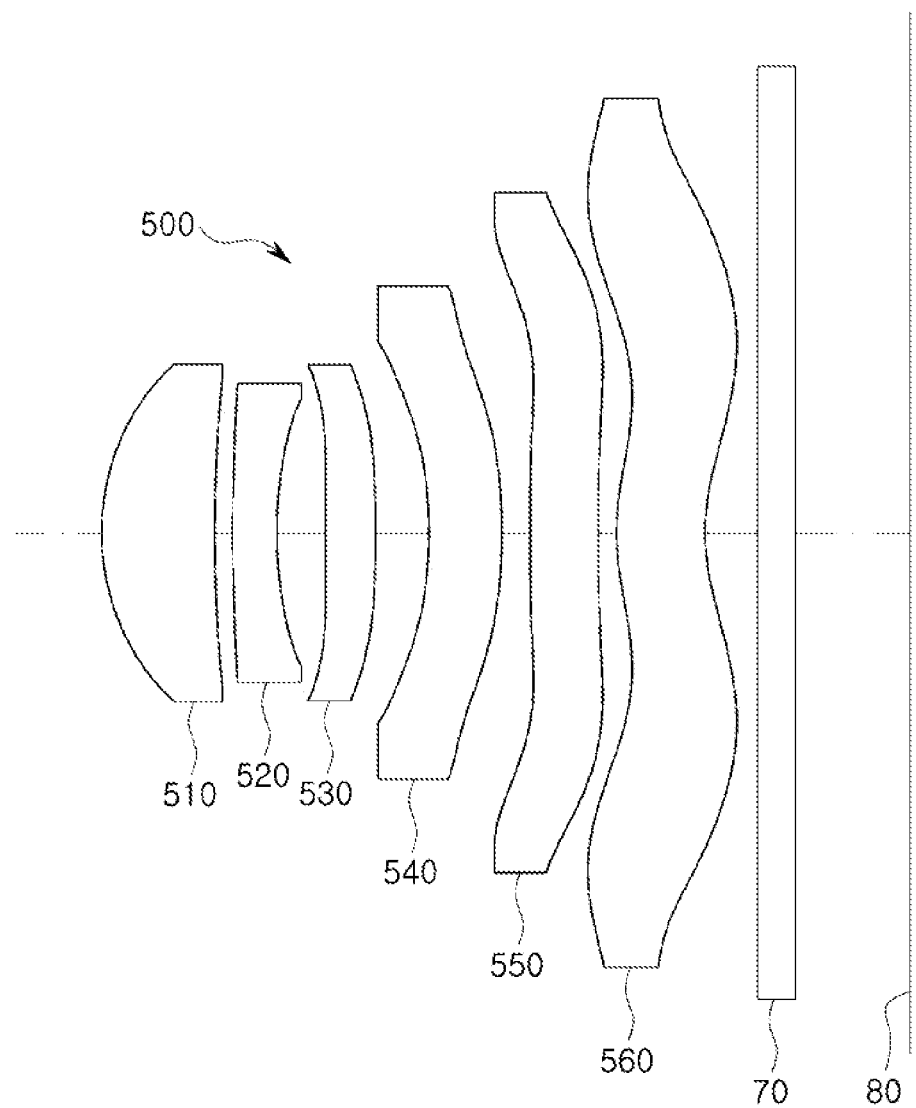
FIG. 17 is a configuration diagram of a lens module according to a fifth exemplary embodiment in the present disclosure.

A lens module according to a fifth exemplary embodiment in the present disclosure will be described with reference to FIG. 17.

A lens module 500 may include an optical system including a first lens 510, a second lens 520, a third lens 530, a fourth lens 540, a fifth lens 550, and a sixth lens 560. In addition, the lens module 500 may further include an infrared cut-off filter 70 and an image sensor 80. Further, the lens module 500 may further include a stop. For example, the stop may be disposed between the second and third lenses.

In the present exemplary embodiment, the first lens 510 may have positive refractive power and have an object-side surface that is convex and an image-side surface that is concave. The second lens 520 may have negative refractive power and have an object-side surface that is convex and an image-side surface that is concave. The third lens 530 may have positive refractive power and have an object-side surface that is convex and an image-side surface that is convex. The fourth lens 540 may have negative refractive power and have an object-side surface that is concave and an image-side surface that is convex. The fifth lens 550 may have negative refractive power and have an object-side surface that is concave and an image-side surface that is concave. The sixth lens 560 may have negative refractive power and have an object-side surface that is convex and an image-side surface that is concave. In addition, the sixth lens may have one or more inflection point formed on each of the object-side surface and the image-side surface thereof.

Aberration characteristics of the lens module will be described with reference to FIG. 18.

Figure 18:
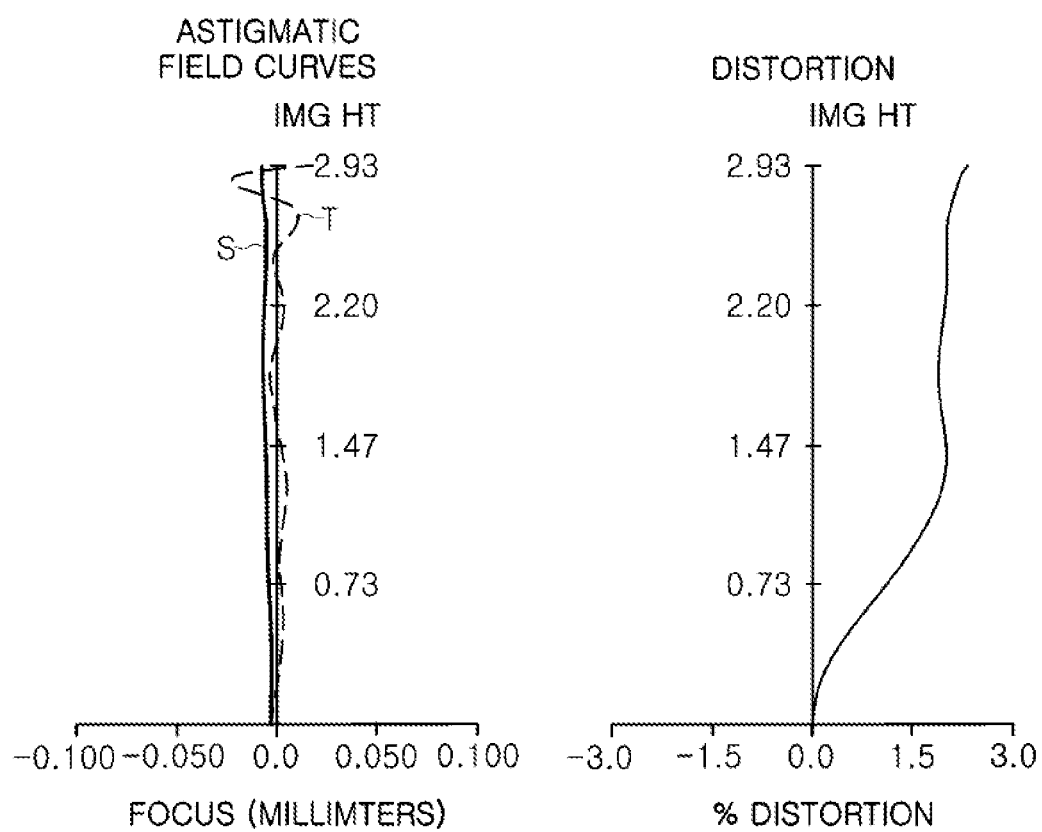
FIG. 18 is graphs having curves representing aberration characteristics of the lens module shown in FIG. 17.

The lens module may have astigmatism and distortion curves as shown in FIG. 18.

Characteristics of the optical system configuring the lens module will be described with reference to FIG. 19.

In FIG. 19, Surface Nos. 2 and 3 indicate first and second surfaces of the first lens, and Surface Nos. 4 and 5 indicate first and second surfaces of the second lens. In a similar scheme, Surface Nos. 7 to 14 indicate first and second surfaces of the third to sixth lenses, respectively. Meanwhile, Surface No. 6 indicates the stop, and Surface Nos. 15 and 16 indicate first and second surfaces of the infrared cut-off filter.

Aspherical surface values of the optical system configuring the lens module will be described with reference to FIG. 20.

In FIG. 20, a horizontal axis means Surface Nos. of the first to sixth lenses, and a vertical axis means characteristics corresponding to each surface of the lenses.

Figure 21:
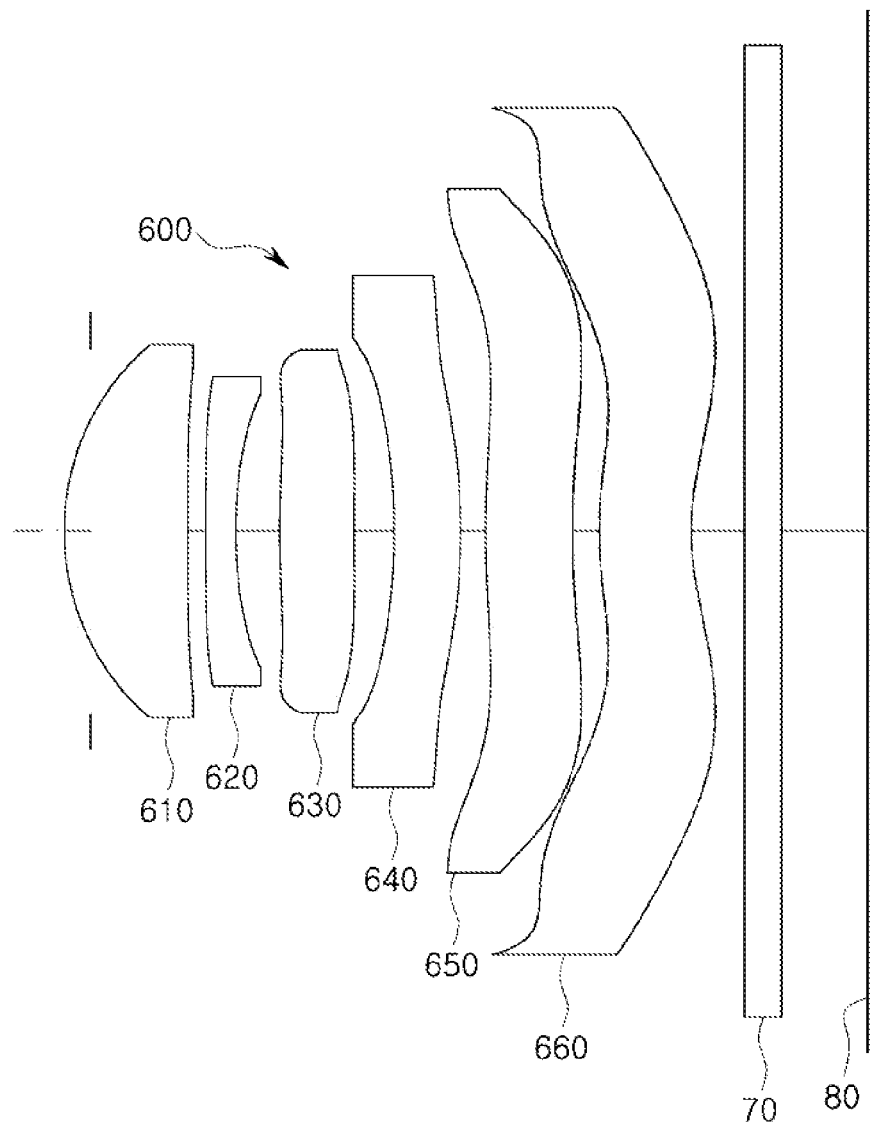
FIG. 21 is a configuration diagram of a lens module according to a sixth exemplary embodiment in the present disclosure.

A lens module according to a sixth exemplary embodiment in the present disclosure will be described with reference to FIG. 21.

A lens module 600 may include an optical system including a first lens 610, a second lens 620, a third lens 630, a fourth lens 640, a fifth lens 650, and a sixth lens 660. In addition, the lens module 600 may further include an infrared cut-off filter 70 and an image sensor 80. Further, the lens module 600 may further include a stop. For example, the stop may be disposed between the second and third lenses.

In the present exemplary embodiment, the first lens 610 may have positive refractive power and have an object-side surface that is convex and an image-side surface that is concave. The second lens 620 may have negative refractive power and have an object-side surface that is convex and an image-side surface that is concave. The third lens 630 may have positive refractive power and have an object-side surface that is convex and an image-side surface that is concave. The fourth lens 640 may have negative refractive power and have an object-side surface that is concave and an image-side surface that is convex. The fifth lens 650 may have negative refractive power and have an object-side surface that is convex and an image-side surface that is concave. The sixth lens 660 may have negative refractive power and have an object-side surface that is convex and an image-side surface that is concave. In addition, the sixth lens may have one or more inflection point formed on each of the object-side surface and the image-side surface thereof.

Aberration characteristics of the lens module will be described with reference to FIG. 22.

Figure 22:
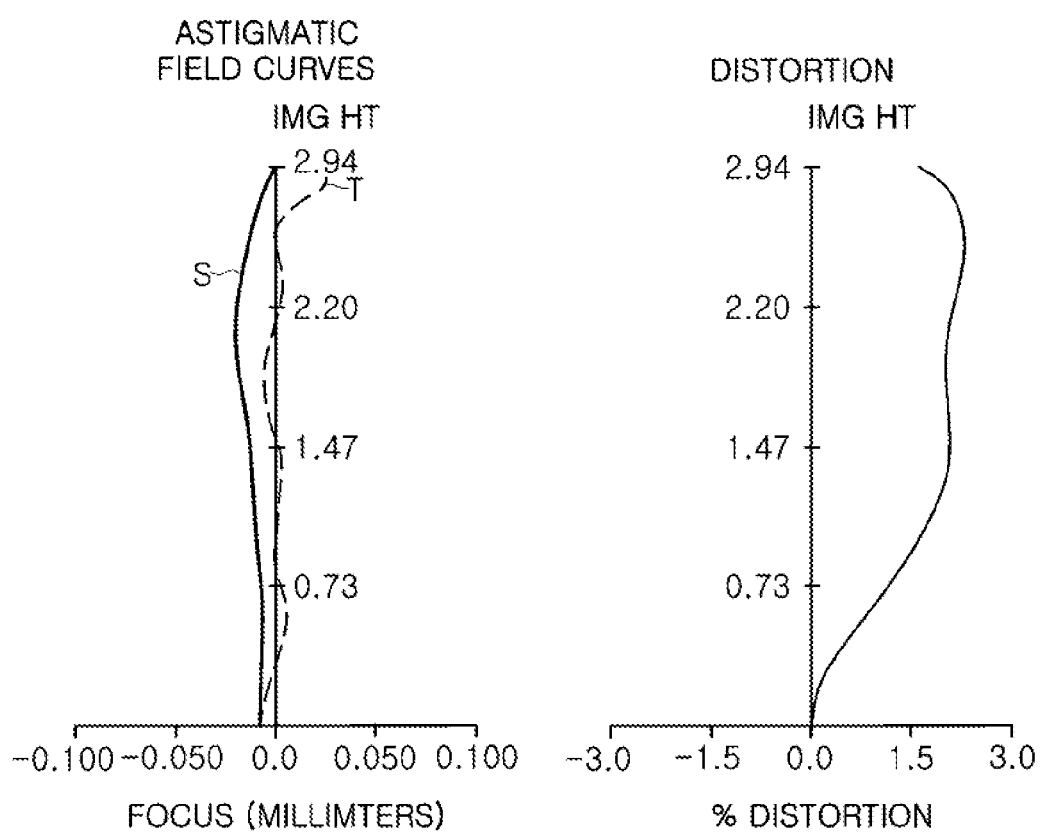
FIG. 22 is graphs having curves representing aberration characteristics of the lens module shown in FIG. 21.

The lens module may have astigmatism and distortion curves as shown in FIG. 22.

Characteristics of the optical system configuring the lens module will be described with reference to FIG. 23.

In FIG. 23, Surface Nos. 2 and 3 indicate first and second surfaces of the first lens, and Surface Nos. 4 and 5 indicate first and second surfaces of the second lens. In a similar scheme, Surface Nos. 7 to 14 indicate first and second surfaces of the third to sixth lenses, respectively. Meanwhile, Surface No. 6 indicates the stop, and Surface Nos. 15 and 16 indicate first and second surfaces of the infrared cut-off filter.

Aspherical surface values of the optical system configuring the lens module will be described with reference to FIG. 24.

In FIG. 24, a horizontal axis means Surface Nos. of the first to sixth lenses, and a vertical axis means characteristics corresponding to each surface of the lenses.

Table 1 shows optical characteristics of the lens modules according to first to sixth exemplary embodiments of the present disclosure. As seen in Table 1, the lens modules may substantially have F No. of 1.90 to 2.10. In addition, the lens module may substantially have an overall focal length (f) of 3.8 to 4.0. In the lens module, a focal length (f1) of the first lens may be substantially determined in a range of 2.5 to 3.1. In the lens module, a focal length (f2) of the second lens may be substantially determined in a range of −6.0 to −4.0. In the lens module, a focal length (f3) of the third lens may be substantially determined in a range of 9.5 to 15.0. In the lens module, a focal length (f4) of the fourth lens may be substantially determined in a range of −60.0 to −14.0. In the lens module, a focal length (f5) of the fifth lens may be substantially determined in a range of −3500 to −20. In the lens module, a focal length (f6) of the sixth lens may be substantially determined in a range of −300 to −15. In the lens module, a composite focal length (f12) of the first and second lenses may be substantially determined in a range of 4.4 to 4.8. In the lens module, an overall length of the optical system may be substantially determined in a range of 4.5 to 5.0. In the lens module, BFL may be substantially determined in a range of 1.10 to 1.40. In the lens module, a field of view (ANG) of the optical system may be substantially determined in a range of 70 to 75 degrees. In the lens module, a radius (EPD/2) of an entrance pupil diameter may be substantially determined in a range of 0.90 to 1.1.

TABLE 1

|  | First Exemplary Embodiment | Second Exemplary Embodiment | Third Exemplary Embodiment | Fourth Exemplary Embodiment | Fifth Exemplary Embodiment | Sixth Exemplary Embodiment |
| --- | --- | --- | --- | --- | --- | --- |
| f (EFL) | 3.97 | 3.97 | 3.97 | 3.97 | 3.97 | 3.88 |
| f1 | 2.938 | 2.938 | 2.956 | 2.925 | 2.934 | 2.653 |
| f2 | −5.677 | −5.805 | −5.880 | −5.673 | −5.700 | −4.506 |
| f3 | 10.402 | 12.472 | 12.005 | 11.717 | 11.226 | 13.865 |
| f4 | −15.017 | −30.602 | −26.233 | −23.245 | −19.252 | −58.650 |
| f5 | −3482.9 | −23.938 | −29.137 | −35.366 | −62.897 | −59.746 |
| f6 | −33.236 | −290.180 | −85.020 | −73.513 | −47.571 | −16.830 |
| f12 | 4.649 | 4.587 | 4.589 | 4.624 | 4.629 | 4.692 |
| EPD/2 | 0.95 | 0.97 | 0.97 | 0.95 | 0.95 | 1.05 |
| FOV | 71.65 | 71.60 | 71.70 | 71.70 | 71.70 | 73.30 |
| FNO | 2.10 | 2.00 | 2.00 | 2.10 | 2.10 | 1.90 |

Table 2 shows numerical ranges of Conditional Expressions and values of Conditional Expressions of the lens modules according to first to sixth exemplary embodiments of the present disclosure.

TABLE 2

| Conditional Expression | First Exemplary Embodiment | Second Exemplary Embodiment | Third Exemplary Embodiment | Fourth Exemplary Embodiment | Fifth Exemplary Embodiment | Sixth Exemplary Embodiment |
|---|---|---|---|---|---|---|
| 1  0.0 < f1/f < 0.9 | 0.74 | 0.74 | 0.74 | 0.74 | 0.74 | 0.70 |
| 2  20 < v1 − v2 < 40 | 32.8 | 32.8 | 32.8 | 32.8 | 32.8 | 32.8 |
| 3  20 < v1 − v4 < 40 | 32.8 | 32.8 | 32.8 | 32.8 | 32.8 | 32.8 |
| 4  20 < v1 − v5 < 40 | 32.8 | 32.8 | 32.8 | 32.8 | 32.8 | 32.8 |
| 5  −2.0 < f2/f < 0.0 | −1.43 | −1.46 | −1.48 | −1.43 | −1.44 | −1.19 |
| 6  0.0 < f3/f < 6.0 | 2.62 | 3.14 | 3.02 | 2.95 | 2.83 | 3.65 |
| 7  f4/f < −2.0 | −3.78 | −7.71 | −6.61 | −5.86 | −4.85 | −15.43 |
| 8  f5/f < −5.0 | −877.31 | −6.03 | −7.34 | −8.91 | −15.84 | −15.72 |
| 9  OAL/f < 1.5 | 1.15 | 1.16 | 1.15 | 1.15 | 1.15 | 1.29 |
| 10  −0.8 < f1/f2 < 0.0 | −0.52 | −0.51 | −0.50 | −0.52 | −0.51 | −0.59 |
| 11  −0.8 f2/f3 < 0.8 | −0.55 | −0.47 | −0.49 | −0.48 | −0.51 | −0.32 |
| 12  BFL/f < 0.50 | 0.29 | 0.29 | 0.29 | 0.29 | 0.29 | 0.35 |
| 13  D12/f < 0.1 | 0.03 | 0.03 | 0.03 | 0.03 | 0.03 | 0.03 |
| 14  0.25 < r1/f | 0.34 | 0.34 | 0.34 | 0.34 | 0.34 | 0.37 |
| 15  r5/f < 0.7 | 4.28 | 4.18 | 4.35 | 4.03 | 4.43 | 1.57 |
| 16  r8/f < −0.6 | −0.94 | −0.83 | −0.84 | −0.87 | −0.90 | −1.22 |
| 17  EPD/2/f12 < 1.0 | 0.20 | 0.21 | 0.21 | 0.21 | 0.21 | 0.22 |

As seen in Table 2, the lens modules according to first to sixth exemplary embodiments of the present disclosure may satisfy all of the Conditional Expressions.

As set forth above, according to exemplary embodiments of the present disclosure, high resolution may be implemented.

While exemplary embodiments have been shown and described above, it will be apparent to those skilled in the art that modifications and variations could be made without departing from the scope of the present invention as defined by the appended claims.

What is claimed is:

1. A lens module comprising:
 a first lens having positive refractive power;
 a second lens having negative refractive power;
 a third lens having positive refractive power;
 a fourth lens having negative refractive power, wherein an image-side surface of the fourth lens, on an optical axis, is convex;
 a fifth lens having negative refractive power; and
 a sixth lens having negative refractive power and having one or more inflection point on an image-side surface thereof.

2. The lens module of claim 1, wherein the following Conditional Expression is satisfied:

$0.0 < f1/f < 0.9$  [Conditional Expression]

where f1 is a focal length of the first lens, and f is an overall focal length of an optical system including the first to sixth lenses.

3. The lens module of claim 1, wherein the following Conditional Expression is satisfied:

$20 < V1 - V2 < 40$  [Conditional Expression]

where V1 is an Abbe number of the first lens, and V2 is an Abbe number of the second lens.

4. The lens module of claim 1, wherein the following Conditional Expression is satisfied:

$20 < V1 - V4 < 40$  [Conditional Expression]

where V1 is an Abbe number of the first lens, and V4 is an Abbe number of the fourth lens.

5. The lens module of claim 1, wherein the following Conditional Expression is satisfied:

$20 < V1 - V5 < 40$  [Conditional Expression]

where V1 is an Abbe number of the first lens, and V5 is an Abbe number of the fifth lens.

6. The lens module of claim 1, wherein the following Conditional Expression is satisfied:

$-2.0 < f2/f < 0.0$  [Conditional Expression]

where f2 is a focal length of the second lens, and f is an overall focal length of an optical system including the first to sixth lenses.

7. The lens module of claim 1, wherein the following Conditional Expression is satisfied:

$0.0 < f3/f < 6.0$  [Conditional Expression]

where f3 is a focal length of the third lens, and f is an overall focal length of an optical system including the first to sixth lenses.

8. The lens module of claim 1, wherein the following Conditional Expression is satisfied:

$f4/f < -2.0$  [Conditional Expression]

where f4 is a focal length of the fourth lens, and f is an overall focal length of an optical system including the first to sixth lenses.

9. The lens module of claim 1, wherein the following Conditional Expression is satisfied:

$f5/f < -5.0$  [Conditional Expression]

where f5 is a focal length of the fifth lens, and f is an overall focal length of an optical system including the first to sixth lenses.

10. The lens module of claim 1, wherein the following Conditional Expression is satisfied:

$OAL/f < 1.5$  [Conditional Expression]

where OAL is a distance from an object-side surface of the first lens to an imaging surface, and f is an overall focal length of an optical system including the first to sixth lenses.

11. The lens module of claim 1, wherein the following Conditional Expression is satisfied:

$-0.8 < f1/f2 < 0.0$  [Conditional Expression]

where f1 is a focal length of the first lens, and f2 is a focal length of the second lens.

12. The lens module of claim 1, wherein the following Conditional Expression is satisfied:

$$-0.8 < f2/f3 < 0.8 \quad \text{[Conditional Expression]}$$

where f2 is a focal length of the second lens, and f3 is a focal length of the third lens.

13. The lens module of claim 1, wherein the following Conditional Expression is satisfied:

$$BFL/f < 0.5 \quad \text{[Conditional Expression]}$$

where BFL is a distance from the image-side surface of the sixth lens to an imaging surface, and f is an overall focal length of an optical system including the first to sixth lenses.

14. The lens module of claim 1, wherein the following Conditional Expression is satisfied:

$$D12/f < 0.1 \quad \text{[Conditional Expression]}$$

where D12 is an air interval between the first and second lenses, and f is an overall focal length of an optical system including the first to sixth lenses.

15. The lens module of claim 1, wherein the following Conditional Expression is satisfied:

$$0.25 < r1/f \quad \text{[Conditional Expression]}$$

where r1 is a radius of curvature of an object-side surface of the first lens, and f is an overall focal length of an optical system including the first to sixth lenses.

16. The lens module of claim 1, wherein the following Conditional Expression is satisfied:

$$r5/f < 0.7 \quad \text{[Conditional Expression]}$$

where r5 is a radius of curvature of an object-side surface of the third lens, and f is an overall focal length of an optical system including the first to sixth lenses.

17. The lens module of claim 1, wherein the following Conditional Expression is satisfied:

$$r8/f < -0.6 \quad \text{[Conditional Expression]}$$

where r8 is a radius of curvature of an image-side surface of the fourth lens, and f is an overall focal length of an optical system including the first to sixth lenses.

18. The lens module of claim 1, wherein the following Conditional Expression is satisfied:

$$(EPD/2)/f12 < 1.0 \quad \text{[Conditional Expression]}$$

where EPD/2 is a radius of an entrance pupil diameter, and f12 is a composite focal length of the first and second lenses.

19. A lens module comprising:
a first lens having positive refractive power, wherein an image-side surface of the first lens, on an optical axis, is concave;
a second lens having negative refractive power, wherein an object-side surface of the second lens, on the optical axis, is convex;
a third lens having positive refractive power, wherein an object-side surface of the third lens, on the optical axis, is convex;
a fourth lens having a convex image-side surface on the optical axis;
a fifth lens having negative refractive power, wherein an image-side surface of the fifth lens, on the optical axis, is concave; and
a sixth lens having refractive power and having one or more inflection point on an image-side surface thereof.

20. The lens module of claim 19, wherein the first lens has a convex object-side surface.

21. The lens module of claim 19, wherein the second lens has a concave image-side surface.

22. The lens module of claim 19, wherein the third lens has a convex image-side surface.

23. The lens module of claim 19, wherein the fourth lens has a concave object-side surface.

24. The lens module of claim 19, wherein the fifth lens has a concave object-side surface.

25. The lens module of claim 19, wherein the sixth lens has a convex object-side surface.

26. The lens module of claim 19, wherein the image-side surface of the sixth lens is concave.

27. The lens module of claim 19, wherein the third lens has a concave image-side surface.

28. The lens module of claim 19, wherein the fifth lens has a convex object-side surface.

\* \* \* \* \*